United States Patent [19]
Kishita et al.

[11] Patent Number: 5,179,159
[45] Date of Patent: Jan. 12, 1993

[54] SILICONE RUBBER COMPOSITION

[75] Inventors: Hirofumi Kishita; Shinichi Sato, both of Annaka; Noriyuki Koike, Yoshii, all of Japan

[73] Assignee: Shin-Etsu Chemical Co., Ltd., Tokyo, Japan

[21] Appl. No.: 710,523

[22] Filed: May 21, 1991

[30] Foreign Application Priority Data

May 22, 1990 [JP] Japan .................................. 2-132248

[51] Int. Cl.$^5$ .............................................. C08K 3/00
[52] U.S. Cl. ..................................... 524/860; 524/862; 524/863; 528/42; 528/32; 528/31; 528/15; 528/24
[58] Field of Search ...................... 528/43, 32, 31, 15, 528/24; 524/860, 862, 863

[56] References Cited

U.S. PATENT DOCUMENTS

| | | | |
|---|---|---|---|
| 3,847,961 | 11/1974 | Koshar | 528/42 |
| 4,525,528 | 6/1985 | Bush et al. | 524/860 |
| 4,742,101 | 5/1988 | Yoshida | 528/42 |
| 4,985,526 | 1/1991 | Kishita et al. | 528/15 |
| 5,118,775 | 6/1992 | Inomata et al. | 528/12 |

FOREIGN PATENT DOCUMENTS

| | | |
|---|---|---|
| 625778 | 8/1961 | Canada ................. 528/42 |
| 0255957 | 2/1988 | European Pat. Off. |
| 0263649 | 4/1988 | European Pat. Off. |
| 0311262 | 4/1989 | European Pat. Off. |
| 0361733 | 4/1990 | European Pat. Off. |

OTHER PUBLICATIONS

Patent Abstracts of Japan, vol. 12, No. 22(C-470) [2869], Jan. 22, 1988, & JP-A-62-174260, Jul. 31, 1987, T. Fukuda, et al., "Fluorosilicone Rubber Composition".

*Primary Examiner*—John C. Bleutge
*Assistant Examiner*—M. W. Glass
*Attorney, Agent, or Firm*—Oblon, Spivak, McClelland, Maier & Neustadt

[57] ABSTRACT

A silicone rubber composition comprises, as the base component thereof, a diorganopolysiloxane having the following general formula:

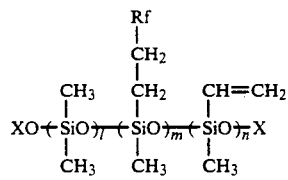

wherein Rf is a perfluoroalkyl group or a perfluoroalkyl ether group, X is hydrogen, $(CH_3)_3Si-$, or $(CH_2=CH)(CH_3)_2Si-$, l and m are each an integer of 1 or above, and n is an integer of 0 or above. The silicone rubber composition has excellent resistance not only to nonpolar solvents such as benzene but also to polar solvents such as ketones, esters, etc.

13 Claims, 1 Drawing Sheet

SILICONE RUBBER COMPOSITION

BACKGROUND OF THE INVENTION

1. Field of the Invention

This invention relates to a silicone rubber composition which has low swelling properties in a variety of solvents.

2. Description of the Prior Art

Silicone rubbers are excellent in electrical insulating property, heat resistance, cold resistance, weatherability, etc. and are used in various fields. However, the silicone rubbers are poor in solvent resistance. For example, upon making contact with or being immersed in a solvent, a silicone rubber swells to be deformed markedly and reduced in strength.

In order to improve the solvent resistance of the silicone rubbers, fluorosilicone rubbers containing a fluoroalkyl group such as 3,3,3-trifluoropropyl have been developed.

The fluorosilicone rubbers exhibit excellent resistance to nonpolar solvents such as benzene, but they are yet poor in resistance to polar solvents such as ketones, esters, etc. In fact, the fluorosilicone rubbers will swell extremely easily in polar solvents.

SUMMARY OF THE INVENTION

It is accordingly an object of this invention to provide a silicone rubber composition which shows excellent resistance to both nonpolar and polar solvents.

According to this invention, there is provided a silicone rubber composition comprising:

(A) a diorganopolysiloxane having the following general formula [I]:

$$XO(\underset{\underset{R^1}{|}}{\overset{\underset{R^1}{|}}{Si}}O)_l(\underset{\underset{R^2}{|}}{\overset{\underset{R^4}{|}}{Si}}O)_m(\underset{\underset{R^1}{|}}{\overset{\underset{R^3}{|}}{Si}}O)_n X \qquad [I]$$

wherein $R^1$ and $R^2$ may be the same or different and each are an unsubstituted or substituted monovalent hydrocarbon group which does not have aliphatic unsaturated bonds, $R^3$ is an unsaturated monovalent aliphatic hydrocarbon group, $R^4$ is a divalent hydrocarbon group not having aliphatic unsaturated bonds or is a group having the following general formula [II]:

$$-R^5-O-R^6- \qquad [II]$$

wherein $R^5$ and $R^6$ are each a divalent hydrocarbon group which does not have aliphatic unsaturated bonds, Rf is a perfluoroalkyl group or a perfluoroalkyl ether group, X is hydrogen or a group having the following general formula [III]:

$$\underset{\underset{R^9}{|}}{\overset{\underset{R^8}{|}}{R^7-Si-}} \qquad [III]$$

wherein $R^7$, $R^8$ and $R^9$ may be the same or different and each are an unsubstituted or substituted monovalent hydrocarbon group, l and m are each an integer of 1 or above, and n is an integer of 0 or above, (B) a filler, and (C) a curing agent.

The silicone rubber composition of this invention has excellent resistance to polar solvents as well as nonpolar solvents, and is highly applicable to such uses as packing material, sealing material, etc.

DETAILED DESCRIPTION OF PREFERRED EMBODIMENTS

(A) Diorganopolysiloxane

Figure 1:
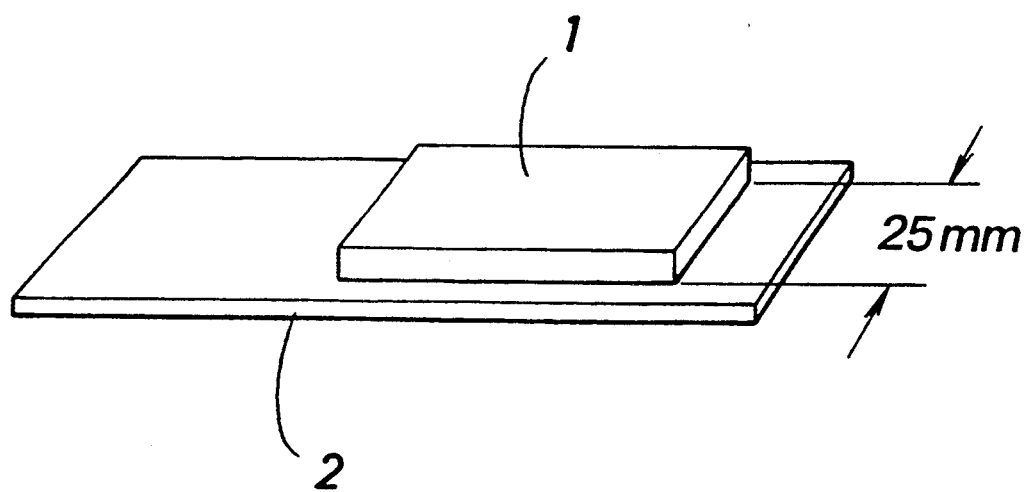
FIG. 1 is an illustration of a test specimen to be used for measurement of releasability of a cured rubber sheet from an epoxy resin.

In the silicone rubber composition according to this invention, a diorganopolysiloxane having the aforementioned general formula [I], namely:

$$XO(\underset{\underset{R^1}{|}}{\overset{\underset{R^1}{|}}{Si}}O)_l(\underset{\underset{R^2}{|}}{\overset{\underset{R^4}{|}}{Si}}O)_m(\underset{\underset{R^1}{|}}{\overset{\underset{R^3}{|}}{Si}}O)_n X \qquad [I]$$

wherein $R^1$ to $R^4$, Rf, l, m and n are as defined above, is used as base component.

In the general formula [I], $R^1$ and $R^2$ are un-substituted or substituted hydrocarbon groups, especially of from 1 to 8 carbon atoms, which do not have aliphatic unsaturated bonds. Specific examples of the groups $R^1$ and $R^2$ include alkyl groups such as methyl, ethyl, isopropyl, butyl, etc.; cycloalkyl groups such as cyclohexyl, cyclopentyl, etc.; aryl groups such as phenyl, tolyl, xylyl, etc.; aralkyl groups such as benzyl, phenylethyl, etc.; halogenated hydrocarbon groups such as chlorocyclohexyl, 3,3,3-trifluoropropyl, etc.; cyanohydrocarbon groups such as 2-cyanoethyl, and so on. Of these groups, particularly preferred in this invention are methyl, ethyl, phenyl, and 3,3,3-trifluoropropyl.

$R^3$ is an unsaturated monovalent aliphatic hydrocarbon group, for example, vinyl, allyl, ethynyl, etc. The vinyl group is particularly preferred. $R^4$ is a divalent group intermediate between the silicon atom and the fluorine-containing group Rf, and is a divalent hydrocarbon group not having aliphatic unsaturated bonds or is a divalent organic group containing an ether linkage having the following general formula [II]:

$$-R^5-O-R^6-[ \qquad [II]$$

wherein $R^5$ and $R^6$ are each a divalent organic group not containing aliphatic unsaturated bonds. Specific examples of $R^4$ include:

$-CH_2-$, $-CH_2CH_2-$, $-CH_2CH_2CH_2-$, $-(CH_2)_6-$,

-continued

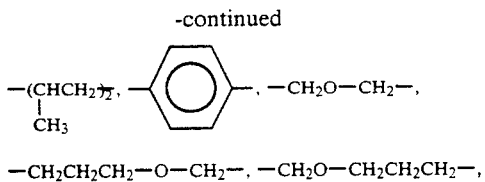

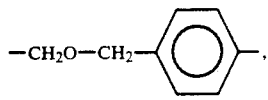

particularly preferred are $-CH_2CH_2-$, $-CH_2CH_2CH_2-$, and $-CH_2CH_2CH_2-O-CH_2-$.

Rf is a fluorine-containing organic group, which is either a perfluoroalkyl group or a perfluoroalkyl ether group. The applicable perfluoroalkyl groups include, for example, those having the following formula:

$C_pF_{2p+1}-$ wherein P is an integer of from 4 to 10. Preferable perfluoroalkyl groups are $C_6F_{13}-$, $C_8F_{17}$, $C_{10}F_{21}-$, and so on. The perfluoroalkyl ether groups usable include, for example, those having from 4 to 20 carbon atoms, preferably $$C_3F_7OCF-,\ C_3F_7OCFCF_2OCF-,\ C_2F_5OCF_2CF_2-,$$
$$\phantom{C_3F_7OCF}|\phantom{CFCF}|\phantom{CFCF_2}|$$
$$\phantom{C_3F_7O}CF_3\phantom{CF}CF_3\phantom{CFCF_2}CF_3$$

$$C_3F_7OCFCF_2OCF_2-,\ C_3F_7OCFCF_2OCFCF_2OCF-,$$
$$\phantom{C_3}|\phantom{F_7OCFCF_2O}|\phantom{F_7OC}|\phantom{F_2OC}|$$
$$\phantom{C_3}CF_3\phantom{F_7OCFCF_2O}CF_3\phantom{F_7OC}CF_3\phantom{F_2OC}CF_3$$

$C_3F_7OCF_2CF_2-,$ $$C_3F_7OCFCF_2OCFCF_2OCFCF_2OCF-,\ \text{and}$$
$$\phantom{C_3}|\phantom{F_7OC}|\phantom{F_2OC}|\phantom{F_2OC}|$$
$$\phantom{C_3}CF_3\phantom{F_7OC}CF_3\phantom{F_2OC}CF_3\phantom{F_2OC}CF_3$$

$$C_3F_7OCFCF_2OCF_2CF_2-.$$
$$\phantom{C_3}|$$
$$\phantom{C_3}CF_3$$

and so on.

X is hydrogen or a group having the following general formula [III]:

$$\begin{array}{c} R^8 \\ | \\ R^7-Si- \\ | \\ R^9 \end{array} \quad [\text{III}]$$

wherein $R^7$ to $R^9$ may be the same or different and each are an unsubstituted or substituted monovalent hydrocarbon group. In the general formula [III], the groups $R^7$ to $R^9$ include, for example, those hydrocarbon groups not having aliphatic unsaturated bonds which have been mentioned as exemplars of $R^1$ above, and alkenyl groups such as vinyl, allyl, hexenyl, etc. Particularly preferred X groups in this invention are hydrogen, $(CH_3)_3Si-$, and $(CH_2=CH)(CH_3)_2Si-$.

In the above general formula [I], l is an integer of 1 or above, preferably from 100 to 10,000, and m is an integer of 1 or above, preferably from 50 to 5,000. n is an integer of 0 or above. It is preferable that $m/(l+m+n)$ has a value of from 1/50 to ¼. As is apparent from the value of n, the diorganopolysiloxane used in this invention does not require the structural unit of the following formula:

$$\begin{array}{c} R^3 \\ | \\ -SiO- \\ | \\ R^1 \end{array}$$

as an essential component thereof. That is, the structural unit is essential to the diorganopolysiloxane only where the diorganopolysiloxane is cured by an addition reaction; when the curing is carried out by use of an organic peroxide, the above structural unit may not necessarily be contained in the diorganopolysiloxane.

As the diorganopolysiloxane, those having a viscosity of from 100 to 10,000,000 at 25° C. are preferably used. These diorganopolysiloxanes may be used either singly or in combination of two or more.

The diorganopolysiloxanes having the aforementioned general formula [I] can be prepared by methods known per se. For example, the diorganopolysiloxanes can be obtained by copolymerizing a cyclotrisiloxane (a) having the following general formula [IV]:

[IV]

wherein $R^1$, $R^2$, $R^4$ and Rf are as defined above, with a cyclotrisiloxane (b) having the following general formula [V]:

[V]

wherein $R^1$ is as defined above, and, optionally, a cyclotrisiloxane (c) having the following general formula [VI]:

[VI]

wherein $R^1$ and $R^3$ are as defined above, in the presence of an alkali or acid catalyst. The diorganopolysiloxanes obtained in this case are those having the aforementioned general formula [I] in which X is hydrogen, namely, those diorganopolysiloxanes which have the silanol group (SiOH) at their molecular ends.

On the other hand, the diorganopolysiloxanes blocked by the group of the aforementioned general formula [III] at their molecular ends can be obtained by carrying out the copolymerization of the cyclotrisiloxanes (a) and (b), optionally with (c), in the presence of a silicon compound having the following formula [VII]:

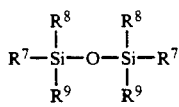

wherein $R^7$ to $R^9$ are as defined above, or the following formula [VIII]:

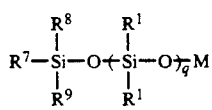

wherein $R^1$ and $R^7$ to $R^9$ are as defined above, q is an integer of 0 or above, and M is an alkali metal.

The alkali or acid catalyst for use in the above copolymerization includes, for example, alkali hydroxides such as lithium hydroxide, sodium hydroxide, potassium hydroxide, etc.; alkali siliconates such as lithium siliconate, sodium siliconate, potassium siliconate, etc.; quaternary salt hydroxides such as tetrabutylphosphine hydroxide, tetramethylammonium hydroxide, etc.; a five-coordinate silicon compound having the following formula:

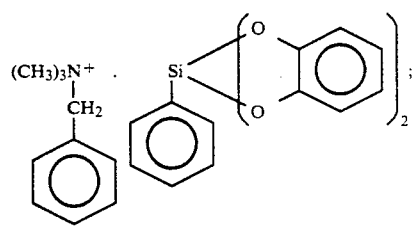

sulfuric acid; sulfonic acids such as trifluoromethanesulfonic acid, and so on.

(B) Filler

In this invention, a filler as component (B) is used, in addition to the diorganopolysiloxane of component (A). As the filler, a variety of fillers conventionally used in general silicone rubber compositions can be used, for example, reinforcing fillers such as fumed silica, precipitated silica, carbon powder, titanium dioxide, mica, aluminum oxide, quartz powder, talc, diatomaceous earths, bentonite, etc.; fibrous fillers such as asbestos, glass fibers, organic fibers, and so on.

In the silicone rubber composition of this invention, the fillers are generally compounded in an amount of preferably from 10 to 300 parts by weight, more preferably from 20 to 200 parts by weight, per 100 parts by weight of the component (A). When the amount of the fillers is less than 10 parts by weight, a sufficient reinforcing effect is not obtainable. If the amount of the fillers exceeds 300 parts by weight, on the other hand, cured products of the composition would have a lowered mechanical strength.

(C) Curing agent

The curing agent to be used in the silicone rubber composition according to this invention includes, for example, organic peroxides and organohydrogenpolysiloxanes having at least one silicon-bonded hydrogen atom in the molecule thereof.

As the organic peroxide, various ones which are conventionally used for organic peroxide crosslinking can be used. The usable organic peroxides include, for example, benzoyl peroxide, 2,4-dichlorobenzoyl peroxide, 4-monochlorobenzoyl peroxide, dicumyl peroxide, tert-butyl perbenzoate, tert-butyl peroxide, 2,5-dimethyl-2,5-bis(tert-butylperoxy)hexane, cumyl-tert-butyl peroxide. These peroxides may be used either singly or in combination of two or more. It is generally preferable to use the organic peroxides in an amount of from 0.2 to 5 parts by weight per 100 parts by weight of the component (A).

When the diorganopolysiloxane of component (A) in the silicone rubber composition of this invention has an unsaturated aliphatic group, namely, when n in the general formula [I] is an integer of 1 or above, the aforementioned organohydrogenpolysiloxane may be used as the curing agent. In such a case, curing of the composition is effected through an addition reaction between the unsaturated aliphatic groups in the diorganopolysiloxane and the silicon-bonded hydrogen atoms in the organohydrogen-polysiloxane.

As the organohydrogenpolysiloxane for this purpose, those organohydrogenpolysiloxanes which are ordinarily used in addition-curing type silicone compositions can be used. Among others, the following organohydrogenpolysiloxanes (1) and (2) are particularly preferred for use in this invention.

(1) Organohydrogenpolysiloxanes having the following formulas (C-1) to (C-4):

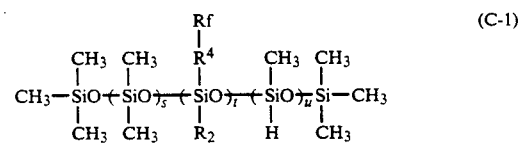

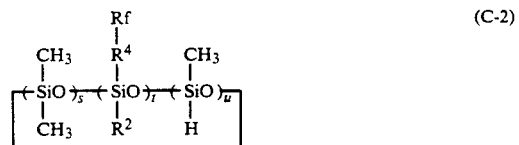

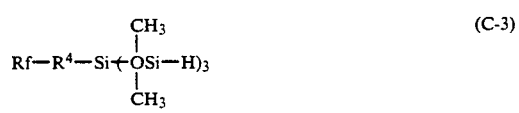

In the above formulas (C-1) to (C-4), $R^2$, $R^4$ and Rf are as defined above, s and t are each an integer of 0 or above, and u is an integer of 1 or above.

(2) Copolymers comprising $(CH_3)_2HSiO_{0.5}$ units and $SiO_2$ units.

It is generally desirable that the organohydrogenpolysiloxanes should have a viscosity of 1,000 or above at 25° C.

It is generally preferable that the amount of the organohydrogenpolysiloxane used is so controlled as to provide at least one ≡Si—H group, more preferably from one to five ≡Si—H groups, per one unsaturated aliphatic hydrocarbon group ($R^3$) in the diorganopolysiloxane of component (A).

Furthermore, when the aforementioned organohydrogenpolysiloxane is used as the curing agent in the silicone rubber composition according to this invention, a platinum family metal catalyst may be used as an addition reaction catalyst. The platinum family metal catalysts include platinum catalysts, palladium catalysts and rhodium catalysts, of which the platinum catalysts are generally preferable. Typical examples of the platinum family metal catalysts for use in this case include platinum black, chloroplatinic acid, complexes of chloroplatinic acid with an olefin, such as ethylene, an alcohol, ether, aldehyde, vinylsilane, vinylsiloxane or the like, and platinum powder supported on a carrier such as alumina, silica, asbestos, etc. These platinum family metal catalysts are generally used in an amount of preferably from 1 to 500 ppm, more preferably from 5 to 20 ppm, in terms as the platinum family metal, based on the component (A).

Other compounding ingredients

In the silicone rubber composition according to this invention, a variety of other compounding agents can be incorporated, in such ranges as not to impair the object of the invention, namely, improvement of solvent resistance. For example, dispersing agents such as diphenylsilanediol, low polymerization degree dimethylpolysiloxanes blocked by the hydroxyl group at their molecular ends, hexamethyldisilazane, etc., heat resistance improving agents such as ferrous oxide, ferric oxide, cerium oxide, iron octylate, etc., coloring agents such as pigments, and so on can be incorporated in the silicone rubber composition, as required.

Silicone rubber composition

The silicone rubber composition according to this invention can be prepared easily by kneading uniformly the aforementioned components by use of a mixing machine such as roll mill, kneader, Banbury mixer, etc.

The silicone rubber composition will cure completely to give a highly elastic, cured silicone rubber product when heated at normal or applied pressure to a temperature of from 100° to 300° C. for a period of from 30 seconds to 1 hour and, if necessary, subjected to secondary curing at 150° to 250° C. for 2 to 24 hours.

The silicone rubber composition of this invention has low swelling properties in a variety of solvents, as well as the intrinsic properties of silicone rubber. Therefore, the silicone rubber composition of the invention is highly suitable for such uses as packing, sealing, etc. Furthermore, the composition of this invention is also suitable for such applications as a rubber material for PPC rolls, a resin mold material defined as the material for an original mold which is used for the production of a mold made of a resin, and so on.

EXAMPLES

This invention will now be demonstrated by the following nonlimitative examples, in which "part(s)" means "part(s) by weight".

Example 1

A one-liter four-necked flask equipped with a stirring rod, a nitrogen inlet pipe, a thermometer and an exhaust pipe was charged with 1000 g of cyclotrisiloxane having the formula:

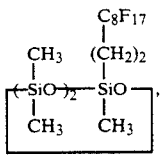

4.2 g of 1,3,5-trivinyl-1,3,5-trimethylcyclotrisiloxane, 1.0 g of tetraglyme, and 0.2 g of a lithium siliconate having the formula:

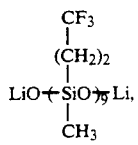

and the resulting mixture was heated to 110° C. with stirring. The reaction mixture started thickening after 10 minutes of heating with stirring. After 4 hours, a rubber gum-like polymer I was obtained.

The polymer I had an average molecular formula as follows:

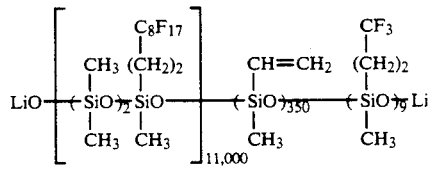

Next, a mixture of 100 parts of the polymer I, 23 parts of fumed silica (specific surface area: 200 m²/g), 2.0 parts of diphenylsilanediol, 1.5 parts of a dimethylpolysiloxane (vinylmethylsiloxane unit content: 10 mol %) having a viscosity of 20 cSt (25° C.) and blocked by the hydroxyl group at both molecular ends, and 1.6 parts of a 3,3,3-trifluoropropylmethylpolysiloxane having a viscosity of 30 cSt (25° C.) and blocked by the hydroxyl group at both molecular ends, was kneaded in a kneader and heated to 150° C. for 4 hours.

Further, 100 parts of the kneaded mixture, 2.0 parts of a dimethylpolysiloxane containing 5 mol % of vinylmethylsiloxane units, 0.3 part of magnesium carbonate, 0.8 part of cerium dioxide, and 0.4 part of 2,5-dimethyl-2,5-bis(t-butylperoxy)hexane were mixed uniformly by a twin-roll mill, to yield a composition I.

The composition I was pressed at a temperature of 165° C. and a pressure of 120 kg/m² for 15 minutes, into a sheet 2 mm thick. The sheet was then heat-treated at 200° C. for 4 hours, and the properties of the sheet thus obtained were examined according to JIS K 6301. The results are shown in Table 1. In this table, and the subsequent ones, the hardness is given in values determined on a type A spring hardness tester according to JIS K 6301.

TABLE 1

| | |
|---|---|
| Specific gravity | 1.51 |
| Hardness | 62 |
| Elongation (%) | 200 |
| Tensile strength (kgf/cm²) | 48 |
| Tear strength A (kgf/cm²) | 12 |
| Compression set (180° C., 22 hr) | 11 |
| Heat resistance: | |
| 200° C., 72 hr | |

TABLE 1-continued

| | |
|---|---|
| Hardness | 65 |
| Elongation (%) | 160 |
| Tensile strength (kgf/cm²) | 48 |
| 230° C., 72 hr | |
| Hardness | 63 |
| Elongation (%) | 120 |
| Tensile strength (kgf/cm²) | 32 |
| Oil resistance in ASTM No. 3 oil; 150° C., 72 hr | |
| Hardness | 58 |
| Elongation (%) | 100 |
| Tensile strength (kgf/cm²) | 21 |

The heat-treated sheet was evaluated as to swelling properties in various solvents. The swelling property was expressed in terms of volume change (%) and weight change (%) observed upon immersion of the sheet in a given solvent at 20° C. for 72 hours. The evaluation results are shown in Table 2.

By way of comparison, respective cured products of a dimethylsilicone rubber KE951 and a fluorosilicone rubber FE251 (of the trifluoropropylmethylsiloxane rubber type), both produced by Shin-Etsu Chemical Co., Ltd., were also subjected to the measurement of swelling properties in the same manner as above. The results are shown in Table 2.

TABLE 2

| Solvent | Swelling | Composition I | KE951 | FE251 |
|---|---|---|---|---|
| Acetone | Volume change (%) | 14 | 26 | 126 |
| | Weight change (%) | 7 | 21 | 71 |
| Ethyl acetate | Volume change (%) | 23 | 143 | 120 |
| | Weight change (%) | 16 | 134 | 76 |
| Toluene | Volume change (%) | 19 | 270 | 18 |
| | Weight change (%) | 11 | 217 | 11 |
| Carbon tetrachloride | Volume change (%) | 23 | 346 | 17 |
| | Weight change (%) | 21 | 416 | 16 |
| Hexane | Volume change (%) | 18 | 186 | 10 |
| | Weight change (%) | 8 | 119 | 2 |

Subsequently, evaluation of release properties of the cured rubber sheet obtained above was carried out by determination of toner release property and epoxy peel force. For comparison, the aforementioned fluorosilicone rubber FE251 was also evaluated in the same manner. The results are shown in Table 3.

TABLE 3

| Properties | Composition I | FE251 |
|---|---|---|
| Toner release property | 70 | 5 |
| Epoxy peel force (g/25 mm) | 320 | 520 |

The toner release property and epoxy peel force were determined by the following methods.

Toner release property

A toner powder was placed on the cured rubber sheet, which was then placed in a 200° C. dryer for 10 minutes to melt the toner powder thereon. The cured rubber sheet with the molten toner thereon was removed from the dryer, followed by cooling to solidify the toner.

A piece of cellophane adhesive tape was adhered to the solidified toner on the cured rubber sheet, and was peeled off.

The ratio of the area of the toner released from the cured rubber sheet together with the adhesive tape thus peeled off to the area over which the adhesive tape had been adhered was measured visually. The ratio thus obtained was used as an indication of toner release property (%).

Epoxy peel force

An epoxy resin 1 was cured on the cured rubber sheet 2, in the manner as shown in FIG. 1. The force required to peel off the cured rubber sheet 2 from the cured epoxy resin 1 was measured, to be used for expressing the epoxy peel force.

Example 2

A 500 ml four-necked flask equipped with a stirring rod, a nitrogen inlet pipe, a thermometer and an exhaust pipe was charged with 500 g of a cyclotrisiloxane having the following formula:

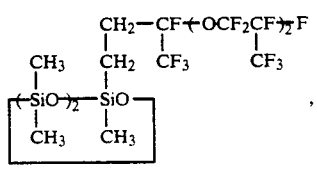

2.1 g of 1,3,5-trivinyl-1,3,5-trimathylcyclotrisiloxane, 0.3 g of tetraglyme, and a lithium siliconate having the average formula:

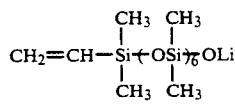

and the resulting mixture was heated to 110° C. with stirring.

The reaction mixture started thickening after 20 minutes of heating with stirring. The heating and stirring operation was continued for 6 hours, to yield a rubber gum-like polymer II was obtained.

The polymer II thus obtained has the following average molecular formula:

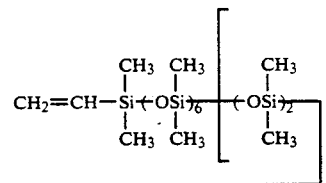

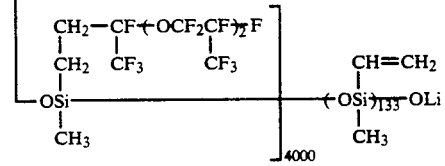

Next, a composition II was prepared according to the same formulation as in Example 1 except for using the polymer II in place of the polymer I. The composition II was pressed in the same manner as in Example I, into a silicone rubber sheet 2 mm thick, which was heat-treated in the same manner as in Example 1.

The heat-treated sheet had the physical properties, toner release property and epoxy peel force as shown in Table 4 below.

TABLE 4

| Properties | Composition II |
| --- | --- |
| Hardness | 52 |
| Elongation (%) | 180 |
| Tensile strength (kgf/cm$^2$) | 56 |
| Tear strength A (kgf/cm$^2$) | 14 |
| Toner release property (%) | 95 |
| Epoxy peel force (g/25 mm) | 90 |

Also, the swelling properties of the heat-treated sheet in various solvents were measured in the same manner as in Example 1. The results are shown in Table 5.

TABLE 5

| Solvent | Swelling | Composition II |
| --- | --- | --- |
| Acetone | Volume change (%) | 20 |
| | Weight change (%) | 11 |
| Ethyl acetate | Volume change (%) | 31 |
| | Weight change (%) | 23 |
| Toluene | Volume change (%) | 25 |
| | Weight change (%) | 15 |
| Carbon tetrachloride | Volume change (%) | 32 |
| | Weight change (%) | 30 |
| Hexane | Volume change (%) | 22 |
| | Weight change (%) | 10 |

Example 3

A 500 ml four-necked flask equivalent to that used in Example 2 was charged with:

(a) 152.1 g of a cyclotrisiloxane having the following formula:

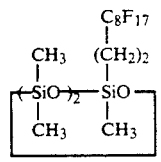

(b) 147.9 g of hexamethylcyclotrisiloxane,
(c) 0.87 g of 1,3,5-trivinyl-1,3,5-trimethylcyclotrisiloxane,
(d) 0.3 g of tetraglyme, and
(e) 0.39 g of the same lithium siliconate as used in Example 2, and the resulting mixture was reacted at 120° C. for 12 hours, to yield a rubber gum-like polymer III.

The polymer III thus obtained had the following average molecular formula:

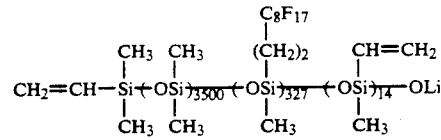

Further, a rubber gum-like polymer IV was obtained in the same manner as above except for changing the amounts of the components to (a) 66.9 g, (b) 233.1 g, (c) 0.87 g, (d) 0.3 g, and (e) 0.39 g, respectively.

The polymer IV thus obtained had the following average molecular formula:

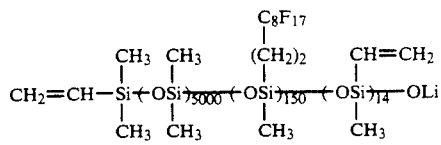

Admixtures of 100 parts of each of the polymers III and IV, obtained above, with 0.5 part of vinyltrimethoxysilane, 2.5 parts of diphenylsilanediol, 8.0 parts of a dimethylpolysiloxane blocked by the hydroxyl group at both molecular ends (viscosity at 25° C.: 30 cSt) and 30 parts of fumed silica, were kneaded at 170° C. for 3 hours by a kneader.

Then, 100 parts of each of the kneaded products thus obtained was mixed uniformly with 0.5 part of cerium dioxide, 8.0 parts of magnesium carbonate and 0.4 part of 2,5-dimethyl-2,5-bis(t-butylperoxy)hexane by a twin-roll mill, to yield a composition III and a composition IV, respectively.

The compositions III and IV were pressed in the same manner as in Example 1 to form silicone rubber sheets 2 mm thick, which were heat-treated in the same manner as in Example 1.

The physical properties of the sheets thus heat-treated were determined. The results are shown in Table 6 below.

TABLE 6

| Physical properties | Composition III | Composition IV |
| --- | --- | --- |
| Hardness | 53 | 51 |
| Elongation (%) | 320 | 340 |
| Tensile strength (kgf/cm$^2$) | 66 | 75 |
| Tear strength A (kgf/cm$^2$) | 14 | 12 |

The swelling properties of the above heat-treated sheet in solvents were determined in the same manner as in Example 1. The results are shown in Table 8 below.

Example 4

A four-necked flask similar to that used in Example 2 was charged with:

(a) 159.3 g of the same fluorine-containing cyclotrisiloxane as used in Example 2,
(b) 140.7 g of hexamethylcyclotrisiloxane,
(c) 0.87 g of 1,3,5-trivinyl-1,3,5-trimethylcyclotrisiloxane,
(d) 0.3 g of tetraglyme, and
(e) 0.39 g of the same lithium siliconate as used in Example 2, and the resulting mixture was reacted at 120° C. for 24 hours, to give a polymer V resembling crude rubber.

The polymer V had the following average molecular formula:

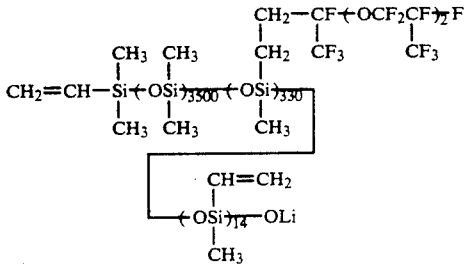

Also, a polymer IV resembling crude rubber was obtained in the same manner as above except for changing the amounts of the components to (a) 70.2 g, (b) 229.8 g, (c) 0.87 g, (d) 0.3 g, and (e) 0.39 g, respectively.

The polymer IV thus obtained had the following average molecular formula:

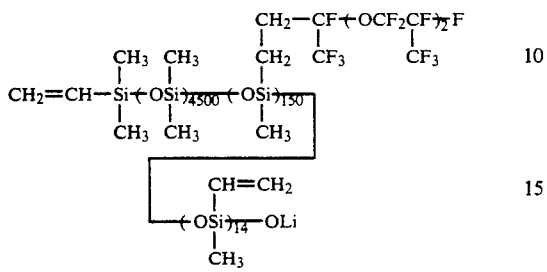

Compositions V and VI were prepared according to the same formulation as in Example 3 except for using the copolymers V and VI, respectively, in place of the copolymer III. The compositions V and VI thus obtained were pressed in the same manner as in Example 1 to form silicone rubber sheets 2 mm thick, which were heat-treated in the same manner as in Example 1.

The physical properties of the heat-treated sheets are shown in Table 7.

TABLE 7

| Physical properties | Composition V | Composition VI |
|---|---|---|
| Hardness | 56 | 56 |
| Elongation (%) | 330 | 350 |
| Tensile strength (kgf/cm$^2$) | 57 | 67 |
| Tear strength A (kgf/cm$^2$) | 12 | 12 |

Further, the swelling properties of the heat-treated sheets in solvents were measured in the same manner as in Example 1. The results are shown in Table 8.

TABLE 8

| | | Example 3 | | Example 4 | |
|---|---|---|---|---|---|
| Solvent | Swelling* | Composition III | Composition IV | Composition V | Composition VI |
| Acetone | V.C. (%) | 30 | 30 | 27 | 28 |
| | W.C. (%) | 19 | 18 | 16 | 15 |
| Ethyl acetate | V.C. (%) | 105 | 98 | 79 | 83 |
| | V.C. (%) | 77 | 70 | 54 | 57 |
| Toluene | V.C. (%) | 154 | 144 | 96 | 103 |
| | W.C. (%) | 107 | 99 | 64 | 66 |

*V.C. = volume change, W.C. = weight change

We claim:

1. A silicone rubber composition comprising:
(A) a diorganopolysiloxane having the following general formula [I]:

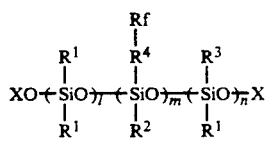

wherein
R$^1$ and R$^2$ may be the same or different and each are an unsubstituted or substituted monovalent hydrocarbon group which contains no aliphatic unsaturated bonds,
R$^3$ is an unsaturated monovalent aliphatic hydrocarbon group,
R$^4$ is —CH$_2$CH$_2$—,
Rf is a perfluoroalkyl ether group linked through carbon to R$^4$
X is a hydrogen atom or a group having the following general formula [III]:

wherein
R$^7$, R$^8$ and R$^9$ may be the same or different and each are an unsubstituted or substituted monovalent hydrocarbon group,
l and m are each an integer of 1 or above, and
n is an integer of 0 or above,
(b) a filler, and
(C) a curing agent.

2. The composition according to claim 1, wherein the diorganopolysiloxane (A) is a diorganopolysiloxane of the general formula [I] in which the monovalent hydrocarbon groups R$^1$ and R$^2$ are each a group of from 1 to 8 carbon atoms.

3. The composition according to claim 2, wherein R$^1$ and R$^2$ are each a group selected from the group consisting of methyl, ethyl, phenyl and 3,3,3-trifluoropropyl groups.

4. The composition according to claim 1, wherein the diorganopolysiloxane (A) is a diorganopolysiloxane of the general formula [I] in which the unsaturated monovalent aliphatic hydrocarbon group R$^3$ is vinyl, allyl or etheynyl.

5. The composition according to claim 1, wherein the fluorine-containing organic group Rf is a perfluoroalkyl ether group of from 4 to 20 carbon atoms.

6. The composition according to claim 5, wherein the fluorine-containing organic group Rf is a group selected from the group consisting of

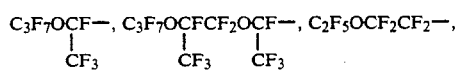

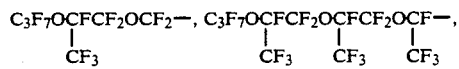

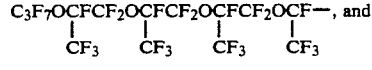

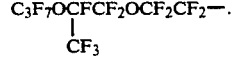

7. The composition according to claim 1, wherein the diorganopolysiloxane (A) is a diorganopolysiloxane of the general formula [I] in which X is hydrogen, (CH$_3$)$_3$Si—, or (CH$_2$=CH)(CH$_3$)$_2$SI—.

8. The composition according to claim 1, wherein the filler (B) is present in an amount of from 10 to 300 parts by weight per 100 parts by weight of the diorganopolysiloxane (A).

9. The composition according to claim 1, wherein the curing agent (C) comprises an organic peroxide.

10. The composition according to claim 9, wherein the organic peroxide is present in an amount of from 0.2 to 5 parts by weight per 100 parts by weight of the diorganopolysiloxane (A).

11. The composition according to claim 1, wherein the diorganopolysiloxane (A) is a diorganopolysiloxane of the general formula [I] in which n is 1 or above, and the current agent (C) comprises an organohydrogenpolysiloxane having at least one silicon-bonded hydrogen atom in its molecule.

12. The composition according to claim 11, wherein the organohydrogenpolysiloxane is compounded in such an amount as to provide from 1 to 5 ≡Si—H groups per one saturated aliphatic group ($R^3$) in the diorganopolysiloxane (A).

13. A cured product obtained by curing the silicone rubber composition as claimed in claim 1.

* * * * *